United States Patent
Chapman et al.

(10) Patent No.: US 8,576,842 B2
(45) Date of Patent: Nov. 5, 2013

(54) TRANSMISSION OF MULTI-CHANNEL MPEG

(75) Inventors: John T. Chapman, Laguna Niguel, CA (US); Denis Downey, Pleasanton, CA (US); Michael J. Healy, Concord, MA (US); Yi Tong Tse, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 283 days.

(21) Appl. No.: 13/192,844

(22) Filed: Jul. 28, 2011

(65) Prior Publication Data

US 2013/0028253 A1 Jan. 31, 2013

(51) Int. Cl.
*H04L 12/28* (2006.01)
*H04J 1/16* (2006.01)

(52) U.S. Cl.
USPC ............................ 370/389; 370/252; 370/487

(58) Field of Classification Search
USPC .......................................... 370/252, 389, 487
See application file for complete search history.

(56) References Cited

U.S. PATENT DOCUMENTS

| | | | |
|---|---|---|---|
| 7,209,442 B1 | 4/2007 | Chapman | |
| 7,688,828 B2 | 3/2010 | Chapman et al. | |
| 7,720,077 B1 | 5/2010 | Healy et al. | |
| 2008/0159140 A1* | 7/2008 | Robinson et al. | 370/232 |

* cited by examiner

*Primary Examiner* — John Pezzlo
(74) *Attorney, Agent, or Firm* — Edell, Shapiro & Finnan, LLC

(57) ABSTRACT

A system, and related methodology, are provided that are configured to receive, at a first network element such as a Universal Edge Quadrature Amplitude Modulator (UEQAM), multiple channels of data delivered as respective streams of packets, form a packet switched communication frame including a sub-layer header, encapsulate packets from the respective multiple channels into a payload field of the packet switched communication frame, identify the packets encapsulated in the payload field with respective tags in the sub-layer header, and transmit the packet switched communication frame to a second network element such as a Downstream Physical (DS-PHY) entity where the individual packets are recovered and mapped to selected respective stream processing resources based on respective tags.

25 Claims, 8 Drawing Sheets

TRANSMISSION OF MULTI-CHANNEL MPEG

TECHNICAL FIELD

The present disclosure relates to processing data in an electronic network.

BACKGROUND

Cable operators have widely deployed high-speed data services on cable television systems. These data services include a cable modem that allows a computer to communicate over an ordinary cable TV network Hybrid Fiber Coax (HFC) cable. A Cable Modem Termination System (CMTS) connects the cable TV network to a data network, such as the Internet. The Data-Over-Cable Service Interface Specification (DOCSIS) is one of the cable modem standards used for transferring data over the cable TV network.

Increasing demand for cable data services requires additional CMTS processing capacity and features. This can be prohibitively expensive since each CMTS provides routing, DOCSIS Media Access Control (MAC) processing, downstream signal modulation and upstream signal demodulation.

DESCRIPTION OF EXAMPLE EMBODIMENTS

Overview

Described herein is a system, and related methodology, configured to receive, at a first network element such as a Universal Edge Quadrature Amplitude Modulator (UEQAM), multiple channels of data delivered as streams of packets, form a packet switched communication frame including a sub-layer header, encapsulate packets from respective channels into a payload field of the packet switched communication frame, identify the packets encapsulated in the payload field with respective tags in the sub-layer header, and transmit the packet switched communication frame to a second network element, such as Downstream Physical (DS-PHY) entity or module (hereinafter, "DS-PHY Module" of "DS-PHY entity") where the packets are recovered and mapped to selected respective stream processing resources. The output of the stream processing resources may then be passed to, e.g., selected quadrature amplitude modulators based on information in the respective tags. In one embodiment, the sub-layer header is in conformance with a Layer 2 Tunneling Protocol version 3 (L2TPv3) sub-layer header.

In one embodiment, the DS-PHY entity, is configured to receive the communication frame including the payload and a sub-layer header, recover the packets from the payload of the communication frame, select a selected stream processing resource based on a tag in the sub-layer header respectively associated with the packets, and process the packets using the selected stream processing resource. Data output from the selected processing resource may be passed to one of a plurality of quadrature amplitude modulators. In one possible implementation, the sub-layer header is part of or embodied in a Layer 2 Tunneling Protocol Version 3 (L2TPv3) transport mechanism.

Example Embodiments

Figure 1:
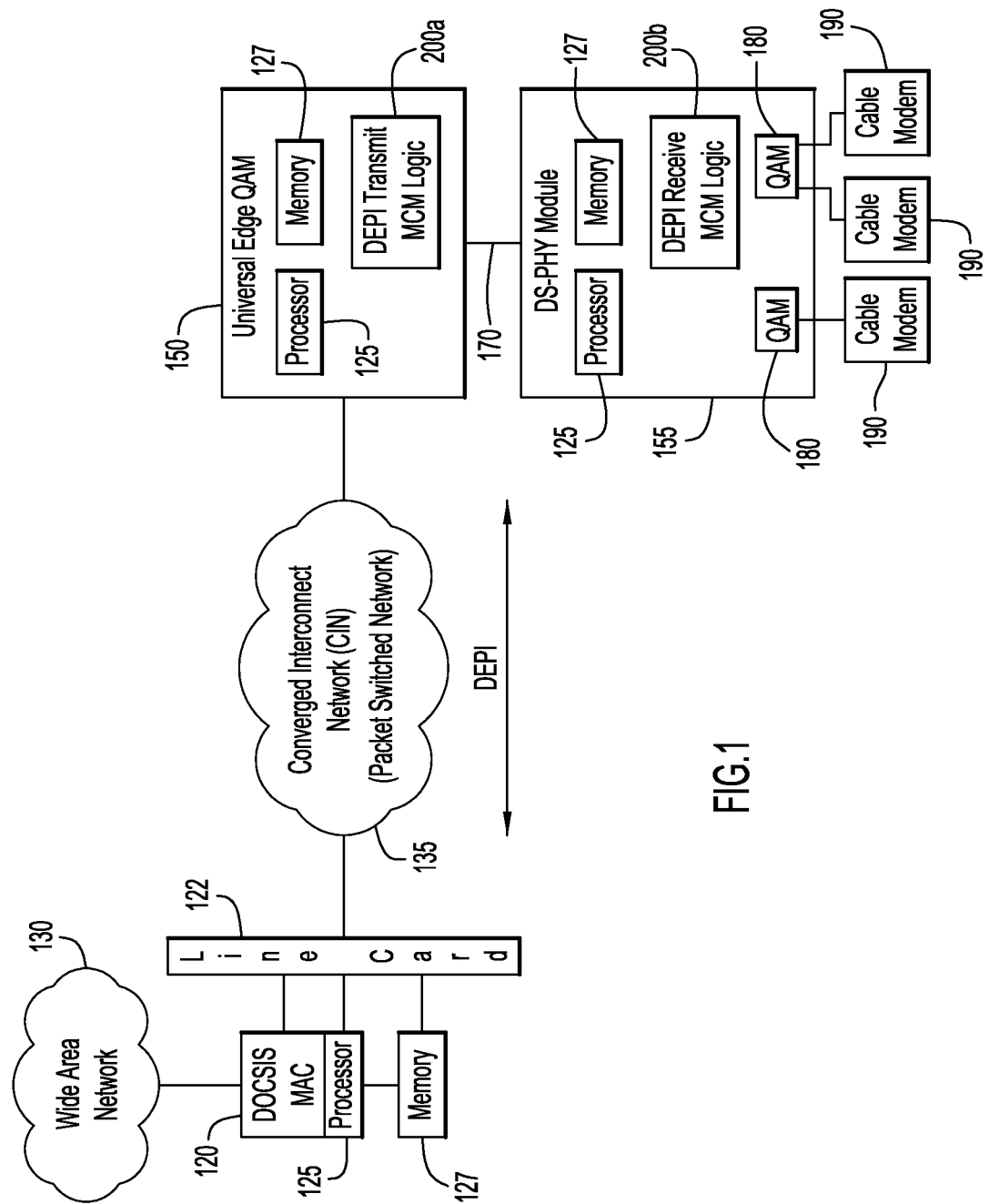
FIG. 1 is a block diagram of an example topology in which multi channel MPEG (MCM) DOCSIS External Physical (PHY) Interface (DEPI) logic is employed to deliver/exchange DOCSIS data between a Universal Edge Quadrature Amplitude Modulator (QAM) (UEQAM) and a Downstream Physical (DS-PHY) Module.

FIG. 1 is a block diagram of an example topology in which multi channel MPEG (MCM) DOCSIS External Physical (PHY) Interface (DEPI) logic is employed to deliver/exchange DOCSIS frames between a first network element such as a Universal Edge Quadrature Amplitude Modulator (QAM) (UEQAM) and a second network element such as a Downstream Physical (DS-PHY) Module. As shown, a DOCSIS MAC 120 is in communication with a wide area network 130, which may be, e.g., the Internet. The DOCSIS MAC 120 may include a processor 125 that has access to memory 127. Also in communication with DOCSIS MAC 120 is a Line Card 122 that enables downstream connectivity with Universal Edge QAM (UEQAM) 150 via a packet switched network 135. That is, Line Card 122 functions as an interface to a network (e.g., a DOCSIS Converged Interconnect Network (CIN)). Line Card 122 could be a separate component or integrated within the DOCSIS MAC 120.

Although shown as separate components, DOCSIS MAC 120 and Line Card 122, along with processor 125 and memory 127, could be configured together in a single component or arranged, separately, in some other configuration that still enables the functionality described herein.

UEQAM 150 similarly comprises a processor 125, memory 127 and, in accordance with one embodiment, DEPI MCM Transmit Logic 200a. That is, and as will be explained more fully below, DEPI MCM Transmit Logic 200a in the UEQAM 150 encodes multiple channels of MPEG transport streams over a DEPI connection between the UEQAM and DS-PHY Module 155. The DEPI MCM Receive Logic 200b in the DS-PHY Module is configured to demultiplex or decode the DOCSIS frames and deliver the resulting frames to respective stream processing resources such that the data encoded in the frames can be delivered to respective QAMs 180. DS-PHY Module 155 also includes an appropriate processor 125 and memory 127, which may include software instructions to perform the functionality of DEPI MCM Receive Logic 200b.

More specifically, DEPI MCM Transmit Logic 200a and DEPI MCM Receive Logic 200b may be implemented as one or more hardware components, one or more software components (written in, e.g., C++, Java, microcode, among many other possible languages/implementations), or combinations thereof. That is, Logic 200a and 200b may be comprised of or be in communication with a programmable processor (microprocessor or microcontroller) or a fixed-logic processor 125. In the case of a programmable processor, any associated memory 127 may be of any type of tangible processor readable memory (e.g., random access, read-only, etc.) that is encoded with or stores instructions that may be employed to effect the DEPI MCM functionality described in more detail below. Alternatively, Logic 200a and 200b may be comprised of a fixed-logic processing device, such as an application specific integrated circuit (ASIC) or digital signal processor that is configured with firmware comprised of instructions or logic that cause the processor 125 or other component to perform the functions described herein. Thus, Logic 200a and 200b may take any of a variety of forms, so as to be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor readable medium that is encoded with instructions for execution by a processor that, when executed by the processor, are operable to cause the processor or Line Card 122 to perform the functions described herein.

As further shown in FIG. 1, multiple QAMs 180 are provided to receive data processed in the DS-PHY Module 155 and thus deliver modulated data to respective cable modems 190 attached to the QAMs 180.

The MCM connection or MCM interface 170 between UEQAM 150 and DS-PHY Module 155 via a packet switched link is enabled by DEPI MCM. DEPI is an Internet Protocol (IP) tunnel that exists between the DOCSIS MAC 120 in a modular cable modem termination system (M-CMTS) core and the UEQAM 150. One of the functions of DEPI is to take either formatted DOCSIS frames or MPEG packets and transport them through an OSI model layer 2 or layer 3 network (e.g., network 135) and deliver them to the UEQAM 150 for further transmission to DS-PHY Module 155 and then further transmission to the cable modems 190.

The base protocol that is used for DEPI is Layer 2 Tunneling Protocol Version 3, or "L2TPv3" (as defined in RFC 3931). L2TPv3 is an Internet Engineering Task Force (IETF) protocol that is a generic protocol for creating a "pseudowire," where a pseudowire is a mechanism to transparently transport a layer 2 protocol over a layer 3 network. Examples of protocols supported by L2TPv3 include asynchronous transfer mode (ATM), High-level Data Link Control (HDLC), Ethernet, Frame Relay, Point-to-Point Protocol (PPP) over Ethernet, among others.

Figure 4:
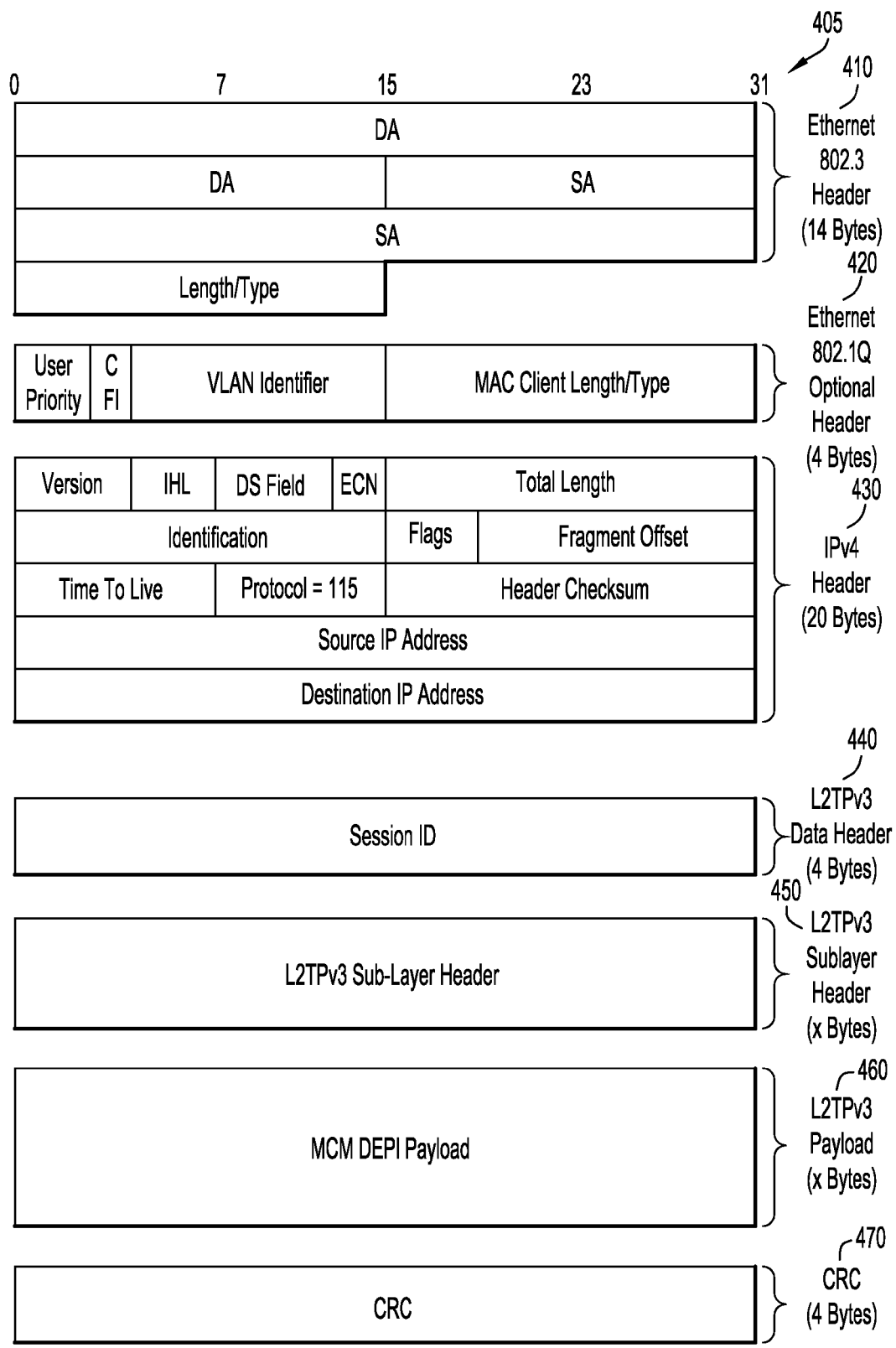
FIG. 4 shows a DEPI MCM data-plane packet format in accordance with one possible implementation.

FIG. 4 (described in more detail later herein) depicts an L2TPv3 Transport Packet format that supports multiplexed DOCSIS frames. As will be explained, each data packet or frame contains, among other things, an expanded sub-layer header that enables a single, e.g., Ethernet Frame to carry packets from multiple MPEG channels and further enables the DS-PHY Module 155 to thereafter parse or demultiplex the packets and recreate the multiple channels that have been encoded and transmitted from the UEQAM 150.

Figure 2A:
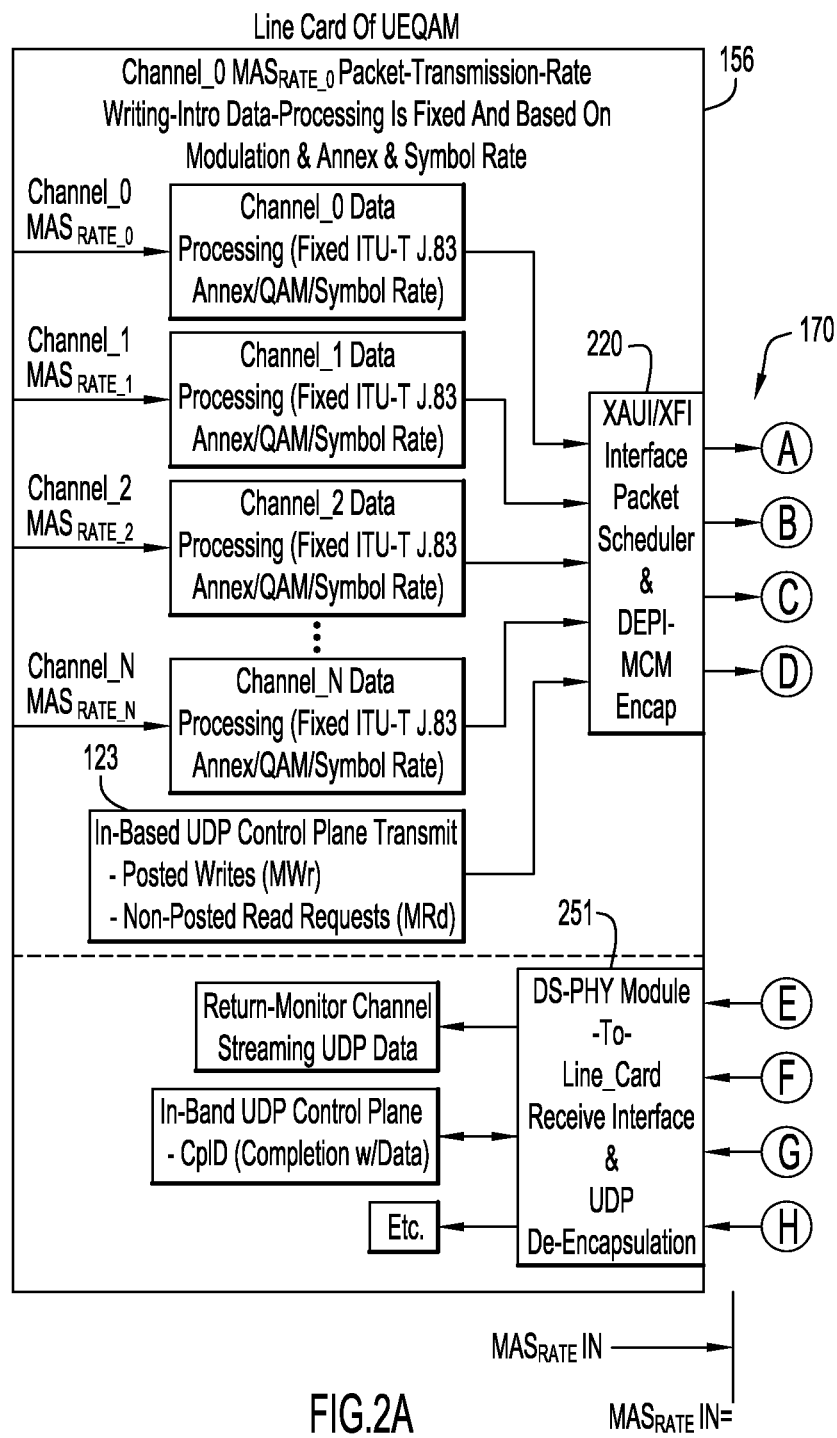
FIGS. 2A and 2B are example block diagrams of a Line Card of a UEQAM and the DS-PHY Module that support DEPI MCM.
Figure 2B:
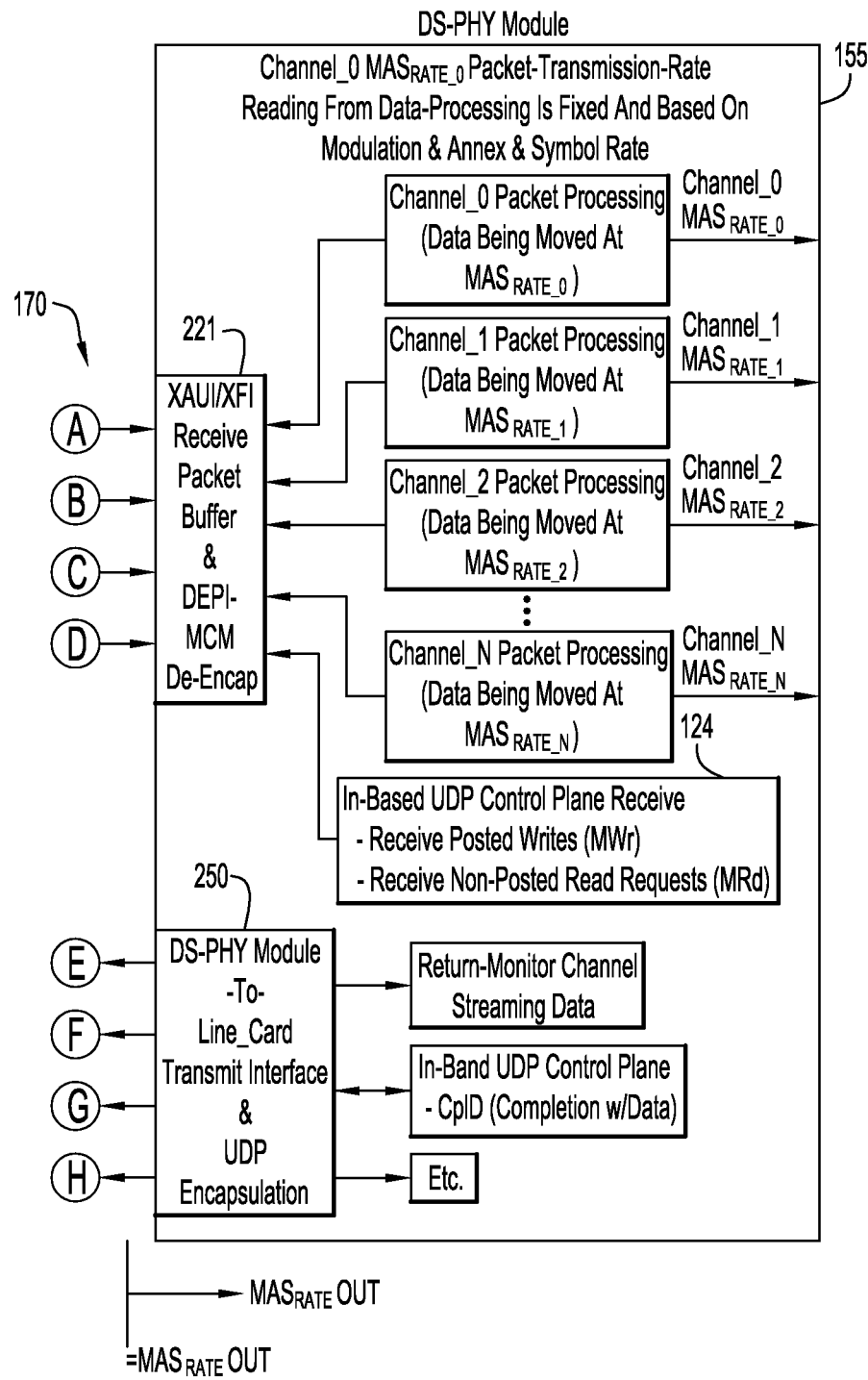

Reference is now made to FIGS. 2A and 2B, which depict an example block diagram of a Line Card 156 in UEQAM 150 and the DS-PHY Module 155, along with data flowing into and out of those components. As shown, Line Card 156 is configured to receive multiple channels comprised of MPEG transport stream (TS) packets. Channels 0-N are depicted in the figure. Each of these channels is supplied at a predetermined $MAS_{RATE}$ (modulation-annex-symbol rate) that is the constant bits-per-second derived from the fixed QAM Modulation, Annex Level and Symbol rate of the system. As further shown, each of the channels is then processed to be compliant with, e.g., a fixed ITU-T J.83 Annex, QAM and symbol rate.

The processed individual channel data is then passed to the interface packet scheduler & DEPI encapsulation module 220. This module may be effectively controlled by DEPI MCM Transmit Logic 200a in UEQAM 150. In a particular implementation, the MCM interface 170 between the Line Card 156 and DS-PHY Module 150 is via Ethernet (e.g., 10 GE, 40 GE or 100GE).

On the other side of the interface between UEQAM 150 and its Line Card 156 and DS-PHY Module 155, DS-PHY Module 155 includes receive packet buffer and DEPI MCM de-encapsulation module 221, which receives, e.g., Ethernet frames via MCM interface 170, and de-encapsulates, parses or de-multiplexes the several MPEG-TS channels that have been transmitted via the DEPI pseudowire. As further shown, the de-encapsulated data streams are passed to respective packet processing modules to generate a data stream that has the same $MAS_{RATE}$ as the original $MAS_{RATE}$ at which the channel data was initially delivered to the Line Card 156. As will be seen in FIG. 3, the resulting channelized data streams are passed to respective QAM Processing Resources 355 and then QAMs for modulation.

In addition to the individual data channels 0-N that are passed between the Line Card 156 and DS-PHY Module 155, In-Band control messages may also be sent via, e.g., User Datagram Protocol (UDP) via In-Band control plane transmit module 123, which passes, for example, posted write and non-posted read requests to interface packet scheduler & DEPI encapsulation module 220 for transmission to DS-PHY Module 155.

Likewise, DS-PHY Module 155 includes a corresponding In-Band control plane receive module 124 that receives de-encapsulated control messages and (although not shown) passes any such messages for further processing.

To establish a complete two-way communication regime, DS-PHY Module 155 may also include a PHY Module to Line Card transmit interface and UDP encapsulation module 250 that enables the DS-PHY Module 155 to send information upstream towards Line Card 156 in UEQAM 150. In one possible embodiment, monitoring data (e.g., QAM monitoring data) can be streamed upstream to the Line Card 156. Also, In-Band UDP control messages can be transmitted to the Line Card 156 with such a configuration.

To receive any such DS-PHY Module-to-UEQAM data, Line Card 156 includes DS-PHY Module to Line Card Receive interface and UDP de-encapsulation module 251. Thus, with a configuration as shown in FIGS. 2A and 2B, multi-channel MPEG transport streams (which may be carrying DOCSIS compliant data) are transported from a Line Card associated with a UEQAM and transmitted to a DS-PHY Module 155 so that the data can be passed to QAMs 180 for delivery to cable modems 190 within end user premises.

Figure 3:
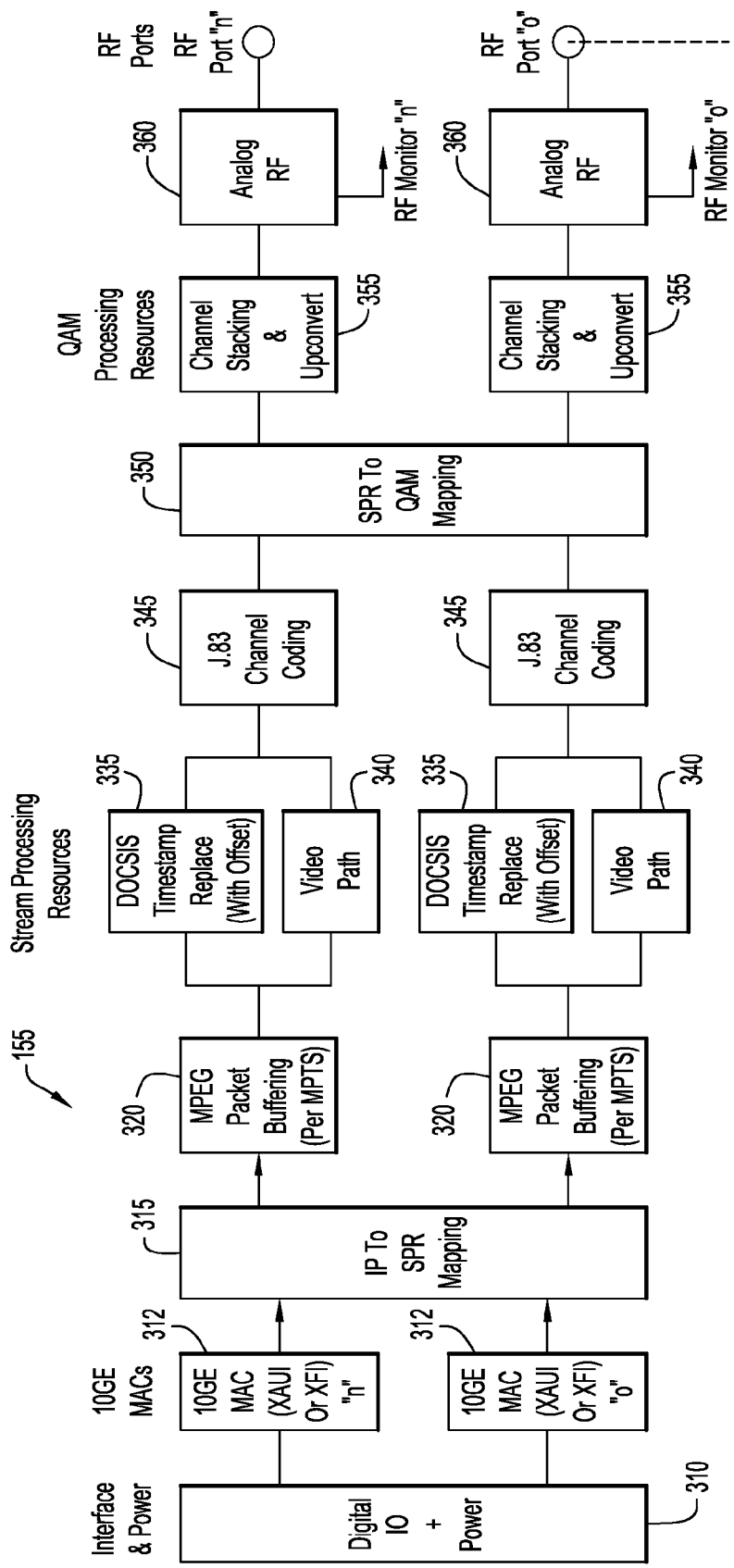
FIG. 3 is an example block diagram of aspects of the DS-PHY Module that supports DEPI MCM, including QAM processing.

FIG. 3 is an example block diagram of features of the DS-PHY Module 155, including QAM processing aspects thereof. On the left hand side of the figure is an interface and power module 310 that supplies digital input/output and power to the DS-PHY Module 155. Elements 312 represent the Ethernet MAC interfaces via which data is received from UEQAM 150. As shown, there may be multiple such Ethernet connections for a given DS-PHY 155. The next element or component in the block diagram is an Internet Protocol (IP) to stream processing resources (SPR) module 315. This module is responsible for parsing the individual channels received via the DEPI MCM protocol (carried via, e.g., Ethernet frames). Element 315 may be operated in accordance with DEPI MCM Receive Logic 200b (not shown in FIG. 3). Each demultiplexed channel is then passed for further processing (as also shown in FIG. 2B). Specifically, the resulting MPEG TS (i.e., each MPTS) is supplied to a per-channel buffer 320 and then passed, depending on the type of data being carried by that MPEG TS, to either a DOCSIS Timestamp Replacement module 335, or to a video path module 340. Thereafter, the data stream is passed to a J.83 channel coding module 345.

Then, each respective processed channel is passed to SPR to QAM Mapping module 350, which is a part of QAM Processing Resources (QPRs). This module maps each channel to a selected QAM 180, wherein channel stacking and upconverting is effected in module 355, and where analog RF is produced in module 360 based on the data stream. The analog RF may then be transmitted via, e.g., a coaxial cable towards customer premises and their respective cable modems 190.

FIG. 4 shows a DEPI MCM data-plane Ethernet packet 405 format in accordance with one possible implementation. It is this packet format and information transmitted therein, and particularly the MCM sub-layer header and payload shown in FIG. 5, that enables multi-channel MPEG DEPI. First with reference to FIG. 4, there is shown a transport packet format used for encapsulating and transporting DOCSIS frames over the MCM interface 170 between UEQAM 150 and DS-PHY Module 155.

Still referring to FIG. 4, an Ethernet header 410 is defined by IEEE-802.3. The Ethernet destination address (DA) of the Ethernet packet 405 is the Ethernet address of the destination (DS-PHY Module 155) or, perhaps, of the next hop router in packet switched network assuming the UEQAM and DS-PHY Module were located distant from each other.

The Ethernet source address (SA) is the Ethernet address of, e.g., the UEQAM or its Line Card.

An Ethernet 802.1Q header 420 is defined by IEEE-802.1Q. Header 420 is optional and provides frame prioritization and Virtual Local Area Network (VLAN) support at layer 2 of the Open System Interconnect (OSI) model.

An IP header 430 is defined by RFC-791. An IP source address in header 430 is the IP address of the UEQAM 150 or its Line Card 156. The IP destination address is the IP address of the DS-PHY Module 155. The IP destination address may be an IP unicast or IP multicast address. Although element 430 is depicted in connection with IPv4, those skilled in the art will appreciate that other versions, such as IPv6 or like protocol may be employed.

The next portion of the Ethernet frame is L2TPv3 data header 440 that comprises a session identifier (ID), which designates a given session between two endpoints in the L2TPv3 tunneling protocol. Elements 450 and 460, L2TPv3 Sub-Layer header and the L2TPv3 payload, respectively, are discussed in detail with respect to FIG. 5. Finally a CRC code 470 completes the Ethernet packet 405.

Figure 5:
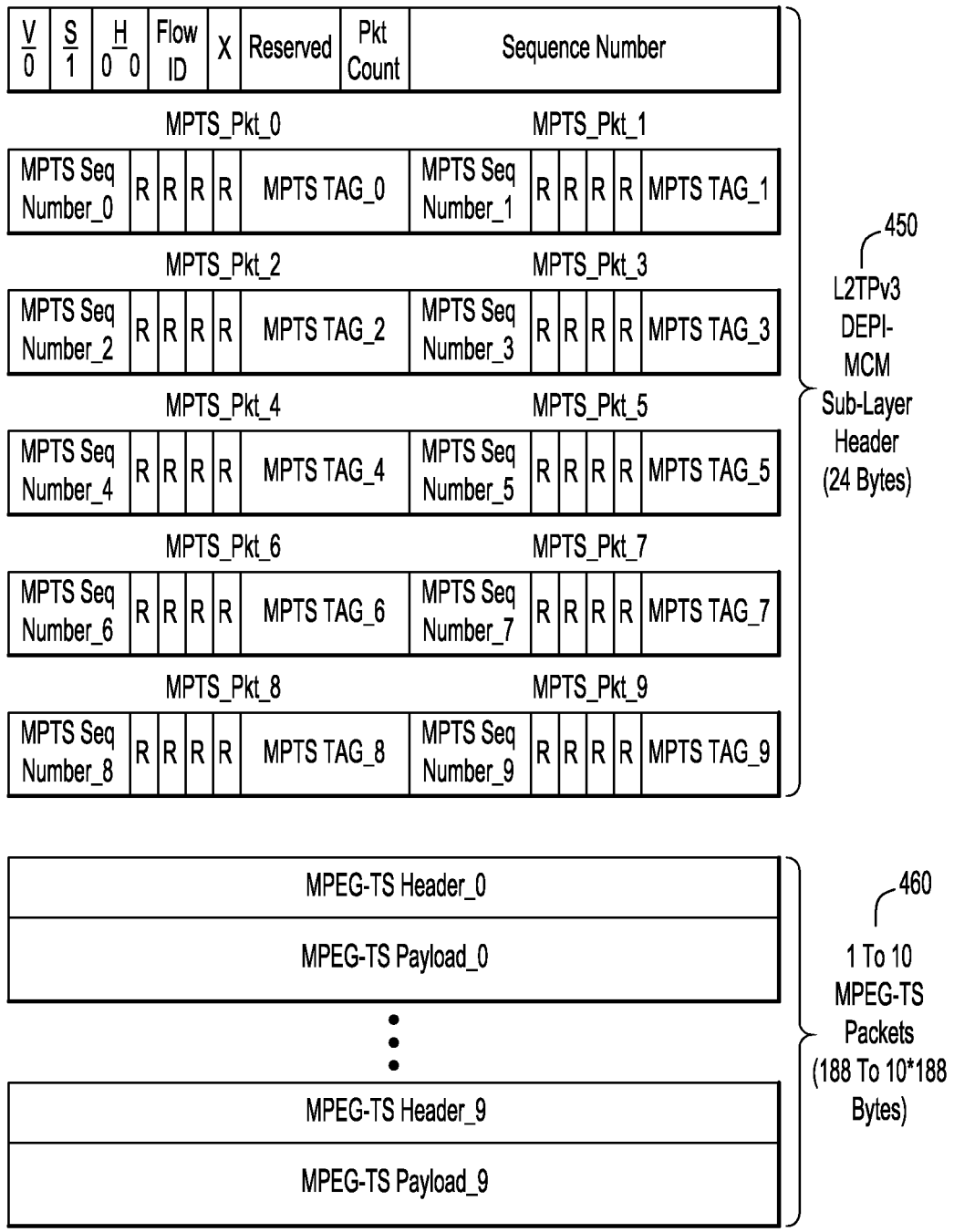
FIG. 5 shows an MCM Sub-Layer header and payload that is part of the DEPI MCM data-plane packet.

FIG. 5 provides details with respect to the MCM Sub-Layer header and payload that is part of the DEPI MCM data-plane packet, and which provides the specific references to the individual channels being transmitted via the Ethernet frame 405 from UEQAM 150. The Sub-Layer header may be generated in the interface packet scheduler & DEPI encapsulation module 220, as controlled by DEPI MCM Transmit Logic 200b.

Specifically, the L2TPv3 DEPI MCM Sub-Layer header 450 comprises multiple fields as follows:

V (1 bit)—VCC bit. This is set to zero and is reserved for compatibility with DEPI and VCCV.

S (1 bit)—Sequence bit. This bit is set to one to indicate that the sequence number field is valid. It is set to zero to indicate that the sequence field is not valid.

H (2 bits)—Extended Header bit. This set of bits is set to zero, which is the same value as in single channel DEPI. The In-Band Ethernet Control Plane chooses MCM Sub-Layer to indicate an MCM sub-layer header is being used to move multiple channels of MPEG in the same IP frame.

Flow ID (3 bits)—Identifies a flow.

Reserved—reserved for future use.

Packet count—indicates the number of individual packets being transmitted.

Sequence Number (2 bytes)—the sequence number increments by one each IP frame sent, and may be used by the receiver (e.g., DS-PHY Module 155) to detect packet loss. The initial value of the sequence number may be random, and thus unpredictable. The sequence number can be used to track lost IP frames.

MPTS Tag (1 byte)—The Multiple Program Transport Stream tag provides a pointer to a selected MPEG-TS Stream processing resource (FIG. 3: 320, 335/340, 345). The MCM IP frame carries multiple MPEG-TS packets all directed at different MPEG-TS processing engines and QAM channels.

MPTS Sequence Number (4 bits)—provides per-channel tracking information for the DS-PHY Module 150. The DS-PHY Module 155 receives MPTS tags and MPTS sequence numbers enabling the DS-PHY Module 155 to count per channel the MPEG-TS packets as they enter the DS-PHY Module 155. As such, the DS-PHY Module 155 may have the capability to replace per-channel MPEG-TS packets with MPEG NULL packets.

The payload 460 of the Ethernet frame includes the same number of MPEG-TS packets as there are MPTS tags in the Sub-Layer header 450, i.e., one tag per packet in the payload, thus enabling the processing of MPEG-TS packets from any one of the channels present at the Line Card 122.

Thus, those skilled in the art will appreciate that the L2TPv3 MCM Sub-Layer Header 450 and payload 460 described herein enables DEPI to carry multiple channels in the same Ethernet Frame. The combination of the L2TPv3 Sub-Layer Sequence Number and MPTS Sequence Number provide highly-reliable/100% error-recovery. Error recovery is defined as lost IP-Frames or lost MPEG-TS Payloads.

The error recovery can be performed at two levels: entire IP-Frame and MPEG-TS packet payload. The L2TPv3 Sequence Number may be helpful for tracking possible lost and/or out-of-order IP-Frames. The destination network component DS-PHY Module can use the L2TPv3 Sub-Layer Sequence number to identify the lost IP-Frame and correct the data-path with null IP-Packet insertion. The MPTS Sequence Number may also help to dynamically correct missing/lost channel-specific MPEG-TS packets. The destination network component DS-PHY Module can use the L2TPv3 Sub-Layer MPTS Sequence Number to identify the lost MPEG-TS Packets and correct the data-path with MPEG NULL Packets.

Further, those skilled in the art will appreciate that, whereas in a "single channel" DEPI implementation wherein all MPEG packets carried by a given IP Frame are meant for or fixed with respect to a single selected QAM, DEPI MCM permits a given IP Frame to carry MPEG-TS packets that may be destined for multiple respective QAMs. By allowing multiple channels within one session, protocol and product scaling may be more easily achieved. For example, a 10 GE link has enough bandwidth for 240 QAM channels. In accordance with the approach described herein, potentially all 240 QAM channels could be placed into a single DEPI MCM session (i.e., there would be 240 unique MPTS tags).

Further, single channel DEPI typically buffers seven MPEG-TS packets before encapsulating and forwarding them to the downstream DS-PHY 155. Such packets typically accumulate at a rate of 38 Mb/s. This represents a latency of about 0.5 ms. Since DEPI MCM can multiplex channels, only one MPEG-TS packet from each of seven (or 10) MPEG channels need be available before an IP Frame can be formed and sent. Accordingly, the approach described herein can reduce latency by up to about 86%.

Figure 6:
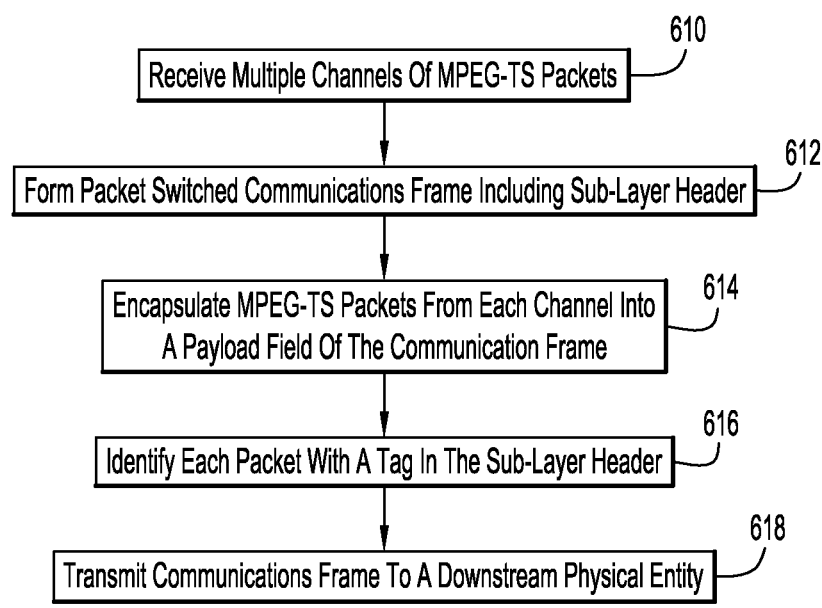
FIGS. 6 and 7 depict example flowcharts illustrating operations for effecting multi-channel MPEG DEPI between a UEQAM and a DS-PHY Module in accordance with one possible implementation.

FIG. 6 depicts a flowchart illustrating operations for effecting multi-channel MPEG DEPI between a first network element such as a UEQAM and a second network element such as a DS-PHY Module in a transmit direction in accordance with one possible implementation. At 610, multiple channels of, e.g., MPEG-TS packets are received in parallel at, e.g., a line card associated with a UEQAM. At 612, the line card (in conjunction with, e.g., DEPI MCM Logic 200) forms a packet switched communication frame including a sub-layer header. In this case, an Ethernet frame may be formed. At 614, MPEG-TS packets from multiple channels are encapsulated into a payload field of the communication frame. To identify each per-channel packet, and at 616, the sub-header layer is completed to include a tag associated with each channel. This tag may be used at the DS-PHY Module to select a specific stream processing resource to be employed to process the respective packets in the payload. At 618, the communication frame is transmitted towards the DS-PHY Module via, e.g., a packet switched network or direct connection.

Figure 7:
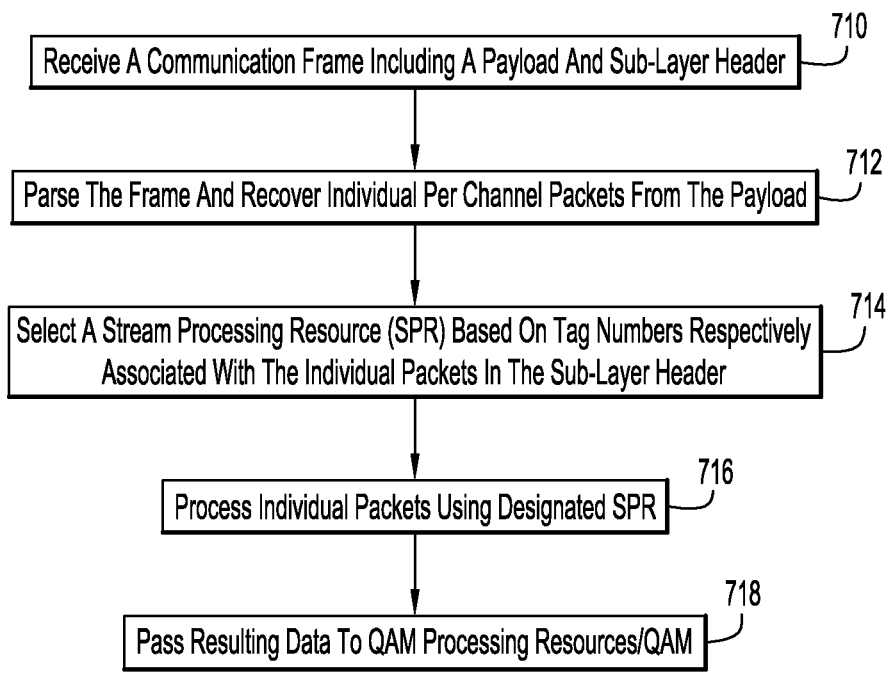

FIG. 7 depicts a flowchart illustrating operations for receiving and de-multiplexing a multi-channel MPEG DEPI compliant frame received at a DS-PHY Module in accordance with one possible implementation. At 710, a communication frame is received including a payload and a sub-layer header. At 712, the frame is parsed to recover the individual per-channel packets from the payload. At 714, a stream processing resource is selected based on tag numbers respectively associated with individual ones of the packets in the payload. At 716, the individual packets are processed using the designated stream processing resources, and at 718, the data resulting from the processing is passed to, e.g., selected QAMs for upconverting and transmission to cable modems at customer premises.

In the embodiments described herein, the DOCSIS frames keep their DOCSIS Program Identifier (PID). Multiplexing is achieved by using a separate MCM table that uses a DEPI assigned identifier. This MCM table is what is stored in the DEPI packet header, i.e., the DEPI MCM Sub-Layer Header 450, as shown in FIG. 5. It is noted further that the intra-QAM channel multiplexing of streams of video and/or DOCSIS packets is performed before the packet-stream reaches the MCM interface 170. The MCM interface 170 moves individual QAM channel data that have already been bit-rate-shaped to meet the very perfect transmission bit-rates of DOCSIS and Video in the ITU-T J.83 digital data transmission standard. Further, DEPI MCM provides multiplexing per packet.

From the foregoing, those skilled in the art will appreciate that the DEPI MCM approach described herein enables packets from multiple channels of data being supplied at a UEQAM to be transmitted to a DS-PHY Module in a multiplexed fashion. This is in contrast to single channel DEPI which enables a single channel of an MPEG TS (which may carry DOCSIS frames) to be transported via, e.g., an Ethernet frame to a connected DS-PHY Module for further processing. By enhancing the L2TPv3 DEPI Sub-Layer header with a table comprising identification tags for each packet that is contained in the payload section of the frame, packets from multiple MPEG TS channels can be transported simultaneously in a single Ethernet Frame. The payload is then parsed within the DS-PHY Module and the respective streams are reconstituted to be identical to the original channel streams.

Although the embodiments described herein may have particular applicability in a modular CMTS environment where components are physically distributed in a network, the MCM functionality can also be employed in connection with an integrated CMTS (I-CMTS) environment. That is, although components of an I-CMTS may be more closely physically bundled, the functionality described here may nevertheless be helpful to enable the multiplexing of multiple channels of MPEG transport streams.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method comprising:
   receiving, at a first network element that processes Data-Over-Cable Service Interface Specification (DOCSIS) compliant data, multiple channels of data delivered as respective streams of packets;
   forming a packet switched communication frame including a sub-layer header;
   encapsulating packets from the multiple channels of data into a payload field of the packet switched communication frame to obtain encapsulated packets;
   identifying the encapsulated packets in the payload field with respective tags in the sub-layer header; and
   transmitting the packet switched communication frame to a second network element.

2. The method of claim 1, wherein the first network element comprises a universal edge quadrature amplitude modulator (UEQAM).

3. The method of claim 1, wherein the streams of packets are compliant with a Motion Picture Experts Group (MPEG) transport streams (TS).

4. The method of claim 1, wherein the packet switched communication frame comprises an Ethernet Frame.

5. The method of claim 1, wherein the sub-layer header is in conformance with a Layer 2 Tunneling Protocol version 3 (L2TPv3) sub-layer header.

6. The method of claim 1, further comprising transmitting an in-band control message to the second network element, wherein the control message is multiplexed with the packets from the respective multiple channels.

7. The method of claim 1, further comprising receiving a message at the first network element from the second network element.

8. An apparatus, comprising:
   an interface unit; and
   a processor configured to:
      receive multiple channels of data delivered as respective streams of packets;
      form a packet switched communication frame including a sub-layer header;
      encapsulate respective packets from the multiple channels into a payload field of the packet switched communication frame to obtain encapsulated packets;
      identify the encapsulated packets in the payload field with respective tags in the sub-layer header; and transmit, via the interface unit, the packet switched communication frame to a downstream network element.

9. The apparatus of claim 8, wherein the apparatus is configured to operate as a universal edge quadrature amplitude modulator.

10. The apparatus of claim 8, wherein the processor is further configured to identify the encapsulated packets in the payload field with a sequence number.

11. The apparatus of claim 8, wherein the processor is further configured to transmit an in-band control message to the downstream network element, wherein the control message is multiplexed with the encapsulated packets.

12. The apparatus of claim 8, wherein the processor is further configured to form the sub-layer header in conformance with a Layer 2 Tunneling Protocol version 3 (L2TPv3) sub-layer header.

13. A method comprising:
  receiving a communication frame including a payload and a sub-layer header in conformance with a Layer 2 Tunneling Protocol Version 3 (L2TPv3) sub-layer header;
  recovering packets from the payload of the communication frame;
  selecting stream processing resources based on information in respective tags in the sub-layer header, wherein the tags correspond with respective packets; and
  processing the packets using the selected stream processing resources.

14. The method of claim 13, further comprising transmitting data output from the selected stream processing resource from at least one quadrature amplitude modulator (QAM).

15. The method of claim 14, further comprising monitoring a status of an output of the at least one QAM and sending a message regarding the status to a universal edge quadrature amplitude modulator (UEQAM).

16. The method of claim 13, wherein the communication frame comprises an Ethernet frame.

17. The method of claim 13, further comprising monitoring a sequence number associated with respective tags to determine whether a packet associated with a given stream of packets is missing.

18. The method of claim 13, further comprising receiving the communication frame from a universal edge quadrature amplitude modulator (UEQAM).

19. The method of claim 13, further comprising mapping data output from the selected stream processing resources to a plurality of quadrature amplitude modulators (QAMs).

20. An apparatus comprising:
  a processor; and
  a memory;
  the processor configured, based on instructions in the memory, to:
    receive a communication frame including a payload and a sub-layer header, wherein the sub-layer header is in conformance with a Layer 2 Tunneling Protocol Version 3 (L2TPv3) sub-layer header;
    recover packets from the payload of the communication frame;
    select a selected stream processing resource based on information from one of a plurality of tags in the sub-layer header respectively associated with the packets; and
    process the packets using the selected stream processing resource.

21. The apparatus of claim 20, further comprising a first quadrature amplitude modulator (QAM) and a second QAM.

22. The apparatus of claim 21, wherein the processor is further configured to pass data output from the selected processing resource to the first QAM or the second QAM.

23. The apparatus of claim 22, wherein the processor is further configured to monitor a status of an output of at least one of the first QAM or second QAM and send a message to a universal edge quadrature amplitude modulator (UEQAM) regarding the status.

24. The apparatus of claim 20, wherein the processor is further configured to monitor a sequence number associated with respective tags to determine whether a packet associated with a given stream of packets is missing.

25. The apparatus of claim 20, wherein the apparatus is a downstream physical (DS-PHY) module.

* * * * *